(12) United States Patent
Wang et al.

(10) Patent No.: US 8,670,328 B2
(45) Date of Patent: Mar. 11, 2014

(54) METHOD FOR CALCULATING INTERLAYER PATH

(75) Inventors: Dajiang Wang, Shenzhen (CN); Zhenyu Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 209 days.

(21) Appl. No.: 13/390,224

(22) PCT Filed: Apr. 28, 2010

(86) PCT No.: PCT/CN2010/072277
§ 371 (c)(1),
(2), (4) Date: Feb. 13, 2012

(87) PCT Pub. No.: WO2011/017940
PCT Pub. Date: Feb. 17, 2011

(65) Prior Publication Data
US 2012/0140762 A1    Jun. 7, 2012

(30) Foreign Application Priority Data

Aug. 13, 2009   (CN) .......................... 2009 1 0166130

(51) Int. Cl.
*H04L 12/28*   (2006.01)
*H04J 3/22*   (2006.01)

(52) U.S. Cl.
USPC ............ 370/241; 370/254; 370/351; 370/465

(58) Field of Classification Search
None
See application file for complete search history.

(56) References Cited

U.S. PATENT DOCUMENTS 8,542,578 B1 * 9/2013 Filsfils et al. ................. 370/228
2006/0176820 A1   8/2006 Vasseur et al.

FOREIGN PATENT DOCUMENTS

CN   101335692 A   12/2008
CN   101502063 A   8/2009

OTHER PUBLICATIONS

D.Wang, Z.Wang, PCE Computation Element Extensions for Inter-Layer Path Computation, Oct. 26, 2009.*
A.Farrel, J.P. Vasseur, J.Ash, A Path Computation Element (PCE)—Based Architecture, Aug. 2006.*
Framework for PCE-Based Inter-Layer MPLS and GMPLS Traffic Engineering, Jun. 2006.*
Path Computation Element (PCE) Communication Protocol Generic Requirements, Sep. 2006.*

(Continued)

*Primary Examiner* — Hassan Kizou
*Assistant Examiner* — Tejis Daya
(74) *Attorney, Agent, or Firm* — McGarry Bair PC

(57) ABSTRACT

In order to achieve the discovery and calculation of interlayer paths, a method for calculating an interlayer path is proposed by the present invention, comprising: a label switch router (LSR) of a layer selecting a path calculation element (PCE) of the layer according to the received discovery information of each PCE and sending thereto a path calculation request for the LSR, wherein the above discovery information comprises: indication information and interlayer information, with the indication information indicating whether the PCE can be used as a default interlayer path calculation element of the layer, and the interlayer information indicating a layer where the PCE is located and an adjacent layer thereof; when a path of the LSR is disconnected, selecting based on the interlayer information a path calculation element (PCE) of the next layer and sending thereto a path calculation request for the disconnected portion of the path until the path is connected; and replying a path calculation result to the PCE of the layer.

20 Claims, 6 Drawing Sheets

(56) References Cited

OTHER PUBLICATIONS

Huang Lili, etc. Research on PCE-based ASON routing technology, Study on Optical Communications, Apr. 2009, No. 5, p. 10-13, 18, ISSN 1005-8778, p. 13 left column line 28-right column line 2, figure 9.

Network Working Group, Reqeust for Comments: 5088; OSPF Protocol Extensions for Path Computation Element (PCE) Discovery [online]: Jan. 2008, [retrieved on Jul. 6, 2010], retrived from: <URL:http://datatracker.ietf.org/doc/rfc5088> section 2 paragraphs 5-6, section 3.1, sections 4.2-4.4.

* cited by examiner

METHOD FOR CALCULATING INTERLAYER PATH

CROSS-REFERENCE TO RELATED APPLICATIONS

This application is a National Phase application of International Application No. PCT/CN2010/072277, filed Apr. 28, 2010, which claims the benefit of Chinese Patent Application No. 200910166130.1, filed Aug. 13, 2009, both of which are incorporated herein by reference in their entirety.

FIELD OF THE INVENTION

The present invention relates to the technical field of routing, and more particularly to a method for calculating an interlayer path.

BACKGROUND OF THE INVENTION

In the GMPLS network architecture, PCE, an emerging technology, has the main function of calculating the route of TE LSP based on the known network topology and restraint condition. RFC4655 and RFC4657 specifically describe the function and architecture of PCE as a path calculation element of GMPLS. The PCE architecture requires the PCC to be able to know one or more PCEs in a domain and the locations of other potential PCEs in other domains (for example, in the case of inter-domain TE LSP calculation). RFC4674 describes the detailed demand of PCE discovery mechanism. RFC5088 and RFC5089 respectively describe the mechanism of implementing the PCE automatic discovery by using OSPF and IS-IS route protocols. This mechanism allows the PCC to automatically discover a set of PCEs and other additional information for the PCC to select a PCE.

Currently, the network models to implement interlayer route calculation mainly comprise single PCE interlayer path calculation model and multiple PCE interlayer path calculation model. In this case, the multiple PCE interlayer path calculation models are further divided into two types, one with PCE communication and the other one without PCE communication. Typical interlayer route calculation model with PCE communication requires one certain PCE to possess visual capability only for the network topology of one designated layer (or several layers limited) and unable to possess visual capability for the network topologies of all the layers, which will be analyzed with FIG. 1 as the example. PCE Hi1 . . . PCE Him are PCEs responsible for the path calculation of upper layer and possess visual capability only for the network topology of H layer. PCE Lo1 . . . PCE Lon are PCEs responsible for the path calculation of lower layer and possess visual capability only for the network topology of L layer.

Before the present invention, the conventional implementation flow for the interlayer path calculation of this model is as follows:

1. LSR H1 sends a path calculation request of H1-H4 to PCE Hi1;
2. PCE Hi1 selects H2 as the ingress node to the lower layer and H3 as the egress node of the lower layer;
3. PCE Hi1 requests from PCE Lo1 to calculate an H2-H3 path;
4. PCE Lo1 returns H2-L1-L2-H3 to PCEHi1; and
5. PCE Hi1 calculates the complete path H1-H2-L1-L2-H3-H4 and returns the same to H1.

This flow exposes certain defects and shortcomings. According to the description of RFC5088 and RFC5089, currently, in the discovery information of PCE, the following are not indicated therein: what layer has the topology for which the PCE possesses visual capability; and what are the adjacent layers of this layer (generally, one certain layer has at most two adjacent layers which are located at its upper layer and lower layer). In this way, when LSR H1 is about to send a path calculation request to the PCE of its layer, it is impossible to learn in advance the adjacent layer information from the discovery information of PCE where its layer can calculate a cross-layer path and thus impossible to prepare in advance for whether to accept the cross-layer path which may be calculated.

In addition, since in the above implementation flow of interlayer path, the network topologies of H layer and L layer and the PCE used by each layer are separated, PCE Hi1, which as H layer can calculate the cross-layer path, can only send an L layer path calculation request to the designated L layer PCE Lo1 and thus cannot obtain the discovery information of L layer PCE Lo1 . . . PCE Lon (mainly including the location of L layer PCE and the layer information of PCE) by way of the flooding of the route protocol. And in terms of RFC4674, the implementation of the discovery requirement of PCE Hi1 as PCC for the L layer PCE, which is proposed by RFC4674, cannot be met inter-layers.

SUMMARY OF THE INVENTION

In order to achieve the discovery and calculation of interlayer paths, a method for calculating an interlayer path is proposed, comprising the steps of: a label switch router (LSR) of a present layer selecting a path calculation element (PCE) of the present layer according to discovery information of each PCE and sending thereto a path calculation request for the LSR, wherein the above discovery information comprises: indication information and interlayer information, with the indication information indicating whether the PCE can be used as a default interlayer path calculation element of the present layer, and the interlayer information indicating a layer where the PCE is located and one or more adjacent layers thereof; when a path of the LSR is disconnected, based on the interlayer information, selecting a path calculation element (PCE) of the next layer and sending thereto a path calculation request for the disconnected portion of the path until the path is connected; and replying a path calculation result to the PCE of the present layer.

In this case, the present layer is a first layer, and the next layer is a second layer: a label switch router (LSR) of the first layer selecting a path calculation element (PCE) of the first layer according to the discovery information of each PCE and sending thereto a path calculation request for the label switch router (LSR); when the path calculation element (PCE) of the first layer determines that a path for the label switch router (LSR) is disconnected, based on the interlayer information, selecting a path calculation element (PCE) of the second layer which is adjacent to the first layer, and sending thereto a path calculation request for the disconnected portion of the path; when a PCE of the second layer determines that a second layer replacement path is connected, replying the second layer replacement path to the PCE of the first layer, wherein the second layer replacement path is a path in the second layer replacing the disconnected portion in the first layer.

In this case, when the PCE of the first layer determines that the path for the label switch router (LSR) is connected, the PCE of the first layer replies the calculated path to the LSR of the first layer.

In this case, before the label switch router (LSR) of the first layer selects a PCE of the first layer according to the layer discovery information, it further comprises: constructing the PCEs of a plurality of layers into a PCE network topology in which the discovery information of each PCE is flooded according to a predetermined embodiment of the route protocol.

In this case, the indication information is the Yd bit of the PATH-SCOPE sub-TLV, the interlayer information is the sub TLV of the PCE layer and the sub TLV of the adjacent PCE layer, wherein when the Yd bit is a first value, the PCED TLV does not include the sub TLV of the adjacent PCE layer; when the Y bit is a second value, the Yd bit is also a second value; and if the Y bit is set as a first value and the Yd bit is set as a second value, then the sub TLV of the adjacent PCE layer needs to appear at least once.

In this case, when the PCE of the second layer determines that the second layer replacement path is disconnected, the PCE of the second layer selects a PCE of a third layer which is adjacent to the second layer according to the interlayer information and sends thereto a path calculation request for the disconnected portion of the replacement path.

In this case, when the PCE of the third layer determines that a third layer replacement path is disconnected, the PCE of the third layer selects a PCE of a fourth layer which is adjacent to the third layer according to the interlayer information and sends thereto a path calculation request for the disconnected portion of the replacement path, wherein the third layer replacement path is a path replacing the disconnected portion in the first layer.

In this case, when the PCE of the fourth layer determines that a fourth layer replacement path is connected, the PCE of the fourth layer replies the calculated path to the PCE of the third layer, wherein the fourth layer replacement path is a path replacing the disconnected portion in the first layer.

In this case, the PCE of the third layer replies the calculated path to the PCE of the second layer.

In this case, the first layer, second layer, third layer, and fourth layer are PSC layer, L2SC layer, TDM layer, and LSC layer respectively.

In this case, the LSR of the layer selecting the path calculation element (PCE) of the layer according to the received discovery information of each PCE comprises: the LSR of the layer parsing the discovery information of each PCE and determining all the PCEs of the layer; and acquiring the indication information of all the PCEs of the layer, and selecting a PCE which is indicated in the indication information that can be used as a default interlayer path calculation element of the layer as the path calculation element (PCE) of the layer.

In this case, based on the interlayer information, selecting a path calculation element (PCE) of the next layer comprises: the path calculation element (PCE) of the layer determining an adjacent layer, wherein the adjacent layer is an adjacent layer indicated by the interlayer information of the PCE; acquiring the indication information of all the PCEs of the adjacent layer; and in all the PCEs of the adjacent layer, selecting a PCE which is indicated by the indication information that can be used as a default interlayer path calculation element as the path calculation element (PCE) of the next layer.

The present invention proposes a new method. In the GMPLS network, under the interlayer path calculation condition of multiple PCE, by adding the information content of a layer into the discovery information of the PCE, the PCC achieves the PCE interlayer path discovery and path calculation, which overcomes the problem in the prior art that the re-calculation application of PCC is caused by that the received cross-layer path does not meet the requirements of the PCC, and thereby improves the execution efficiency of the PCC applying for calculating the interlayer path.

BRIEF DESCRIPTION OF THE DRAWINGS

The drawings illustrated here provide a further understanding of the present invention and form a part of the present invention. The exemplary embodiments and the description thereof are used to explain the present invention without unduly limiting the scope of the present invention. In the drawings.

DETAILED DESCRIPTION OF EMBODIMENTS

For better understanding of the objects, technical solutions and advantages of the present invention, the present invention will now be further described in detail hereinafter in conjunction with drawings and embodiments. It should be understood that the particular embodiments described here only serve to explain the present invention and are not intended to limit the present invention.

Figure 1:
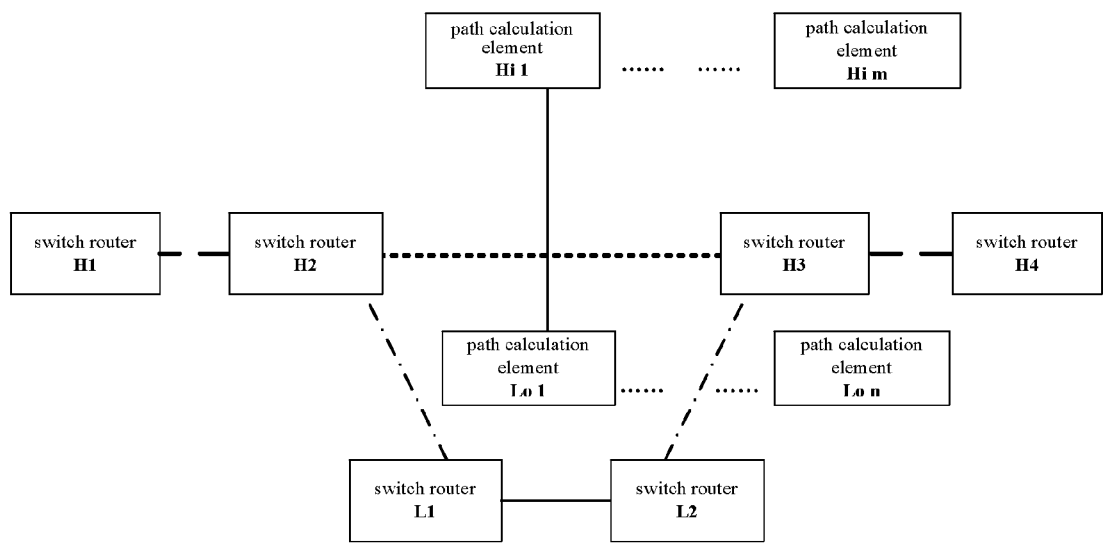
FIG. 1 is a schematic diagram of a multiple PCE interlayer path calculation model with PCE communication.

For the interlayer path calculation scenario in FIG. 1, the present invention extends the discovery information of the PCE according to RFC5088 and RFC5089 and adds indication information and interlayer information into the discovery information, wherein the indication information indicates whether this PCE can be used as a default interlayer path calculation element of the present layer, and the interlayer information indicates a layer where this PCE is located and an adjacent layer thereof, so as to implement the PCE interlayer path discovery and path calculation by the PCC. The discovery information of the PCE can be extended by the following way (but not limited thereto):

The definition of Yd bit is added in the PATH-SCOPE sub-TLV of the discovery information PCED TLV of the PCE, and contents such as PCE layer sub-TLV and adjacent layer adjacent-PCE layer sub-TLV are additionally added therein.

Figure 2:
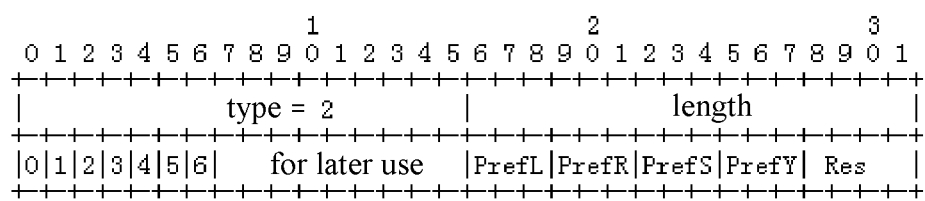
FIG. 2 is a schematic diagram of the extended definition of PATH-SCOPE sub-TLV of the discovery information PCED TLV of PCE.

For the consideration of the implementation of interlayer path calculation function, the present invention extends the PATH-SCOPE sub-TLV described by RFC5088 and RFC5089 and adds Yd bit, and the particular format can be found referring to FIG. 2.

In this case, the following bits are defined (except for Yd bit, all the others are defined according to the current standards):

0. L bit can calculate an intra-area path.
1. R bit can be used for calculating the PCE of an inter-area TE LSP.
2. Rd bit can be used for calculating a default PCE of an inter-area TE LSP.
3. S bit can be used for calculating a PCE of an inter-AS TE LSP.

4. Sd bit can be used for calculating a default PCE of an inter-AS TE LSP.

5. Y bit can be used for calculating a PCE of an interlayer TE LSP.

6. Yd bit can be used for calculating a default PCE of an interlayer TE LSP.

PrefL field for calculating the priority of the PCE of an intra-area TE LSP.

PrefR field for calculating the priority of the PCE of an inter-area TE LSP.

PrefS field for calculating the priority of the PCE of an inter-AS TE LSP.

PrefY field for calculating the priority of the PCE of an interlayer TE LSP.

RES for being reserved for later use.

Yd bit corresponds to Y bit in the RFC5088 and RFC5089 standards. Yd bit is mainly used for indicating that this PCE can be used as a default interlayer path calculation PCE of the present layer. That is, this PCE can calculate a path across adjacent layers, and if the PCC requires the TE LSP to pass through the adjacent layer or deems that this TE LSP (label switching path) can pass through the adjacent layer, in the situation where the discovery information of other PCEs meets the requirements, this PCE will be first selected as a path calculation request object. When Yd bit is set as 1, PCED TLV cannot contain any adjacent-PCE layer sub-TLV. When Y bit is set as 0, Yd should also be set as 0. If Y bit is set as 1 and Yd bit is set as 0, then the adjacent-PCE layer sub-TLV needs to appear at least once.

The PCE layer sub-TLV and adjacent-PCE layer sub-TLV are optional. They can appear in the PCED TLV so as to facilitate the LSR of the present layer, as the PCC, to select the PCE of the present layer which possesses interlayer calculation capability and facilitate the PCE of the present layer, as the PCC, to select the PCE of the adjacent layer.

The PCE layer sub-TLV designates a network topology layer where the PCE is located, and the PCE possesses visual capability for the network topology of this layer and can calculate the LSP route which passes through this layer. The content of PCE layer sub-TLV generally is not influenced by other IGP information (such as OSPF and IS-IS protocols), such as whether the PCE possesses interlayer calculation capability and the flooding range of the PCE discovery information. The PCE layer sub-TLV mainly floods in the network topology layer where the PCE possesses visual capability and the above PCE topology. Generally, one PCED TLV only includes one PCE layer sub-TLV, but it does not exclude the situation that several PCE layer sub-TLVs are included therein, and at this moment, this PCE possesses visual capability for several network topology layers.

Figure 3:
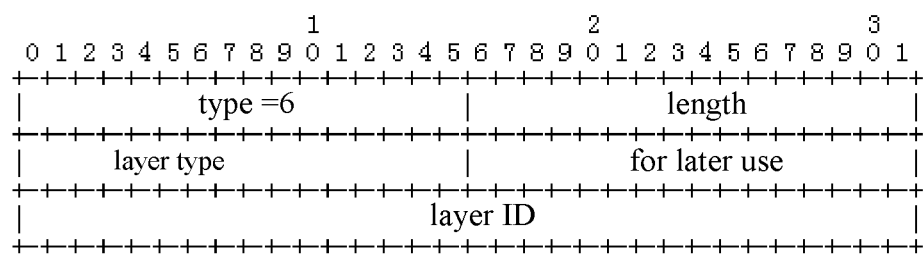
FIG. 3 is a schematic diagram of the definition of the PCE layer sub-TLV.

The format of PCE layer sub-TLV is as shown in FIG. 3.

Currently, there are mainly the following 5 layer types well-known:

Packet Switch Capable (PSC);
Layer-2 Switch Capable (L2SC);
Time-Division Multiplexer Capable (TDM);
Lambda Switch Capable (LSC); and
Fiber-Switch Capable (FSC).

In this case, the layer ID represents the 32 bit layer ID of the layer which possesses visual capability and can calculate a path.

The adjacent-PCE layer sub-TLV indicates an adjacent topology layer of the layer where the PCE is located and represents that this PCE can calculate the path of this adjacent layer. That is to say, this PCE can join the interlayer TE LSP path calculation by this adjacent layer. The adjacent-PCE layer sub-TLV mainly floods in the network topology layer where the PCE possesses visual capability and the above PCE topology. Corresponding to each PCE layer sub-TLV included in the PCED TLV, generally there can be at most two adjacent-PCE layer sub-TLVs which are located in the upper layer and lower layer of this PCE-layer respectively. If Y bit is set as 1 and Yd bit is set as 0, then the adjacent-PCE layer sub-TLV needs to appear at least once.

Figure 4:
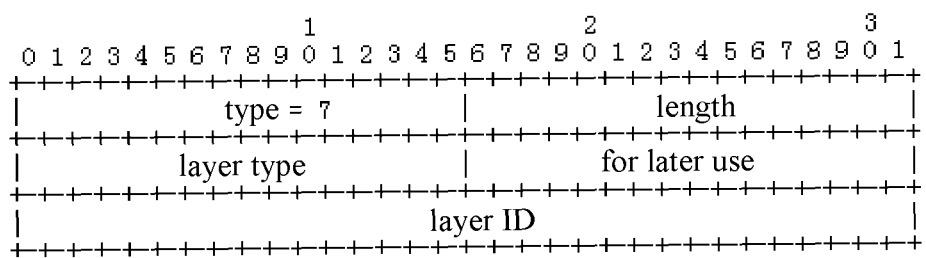
FIG. 4 is a schematic diagram of the definition of the adjacent-PCE layer sub-TLV.

The format of the adjacent-PCE layer sub-TLV is as shown in FIG. 4. In this case, the layer ID represents a 32 bit layer ID of the adjacent layer which can calculate a path.

By then, the above PCE layer information will be included in the PCED TLV and is flooded in the layer where the PCE possesses visual capability by way of the discovery mechanism of RFC5088 and RFC5089, which makes the LSR node, which is used as the PCC, able to select a PCE by reference to the layer discovery information of the PCE.

At the same time, for the flooding range of the PCE discovery information, the present invention further proposes an important mechanism: the PCEs of all layers form one PCE network topology and implement the flooding of the PCE discovery information in the PCE network topology by way of a predetermined route protocol (such as OSPF or IS-IS) example which only runs in the PCE network topology. Thus under the interlayer path calculation condition, the PCE of one certain layer, which is used as the PCC, can obtain contents of the PCEs of other layers such as layer information and location information according to the discovery information flooded by the PCE of other layers and select therefrom a suitable PCE which belongs to the requested adjacent layer so as to initiate thereto an adjacent layer path calculation request.

In this way, both the selection of PCE Hi1 from PCE Hi1 ... PCE Him by H1 and the selection of PCE Lo1 from PCE Lo1 ... PCE Lon by PCE Hi1, as shown in FIG. 1, can be automatically implemented on the basis of the layer discovery mechanism proposed in the present invention.

Figure 5:
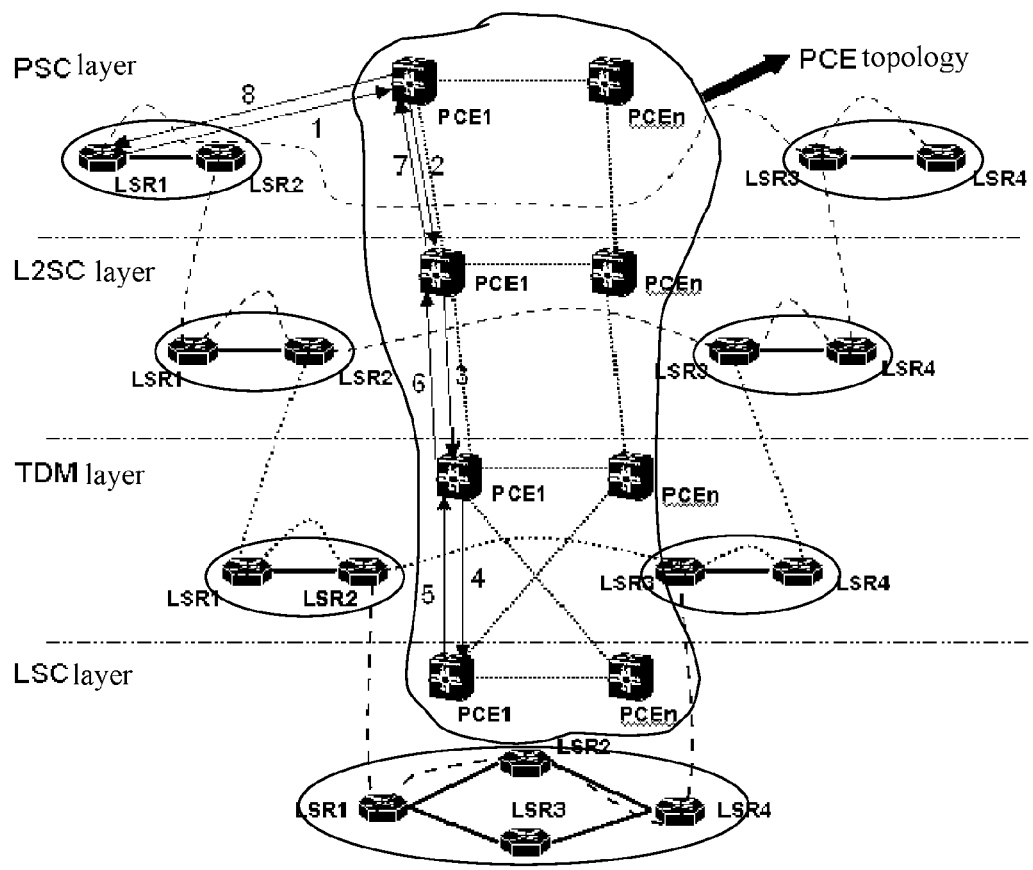
FIG. 5 is a schematic diagram of an interlayer path calculation example implemented on the basis of the discovery information of the PCE layer.

FIG. 5 shows an example of interlayer path calculation implemented on the basis of PCE layer discovery information, in which the PCEs of individual layers which possess interlayer path calculation capability forms one PCE topology, and the discovery information (including layer discovery information) of the PCE will flood in the LSR topology and PCE topology of all the layers. The detailed implementation steps are as follows.

The LSR1 of the PSC layer selects the PCE1 of the PSC layer according to the received discovery information (including layer discovery information) of each PCE and initiates toward PCE1 a path calculation request to the LSR4 of the present layer.

The selection of the PCE1 of the PSC layer can be implemented by the following way (but not limited thereto): LSR1 parses the discovery information of each PCE and determines all the PCEs of the present layer; acquires the indication information of all the PCEs of the present layer and selects as the path calculation element PCE1 of the present layer a PCE which is indicated by the indication information of all the PCEs of the present layer to be able to be used as a default interlayer path calculation element of the present layer.

The PCE1 of the PSC layer discovers that the topology area between the LSR1 and LSR4 of the present layer is disconnected, then selects the PCE1 of the adjacent L2SC layer according to the layer information flooded by each PCE in the PCE topology and sends thereto a path calculation request from layer boundary node LSR2 to LSR3 of the PSC layer.

The selection of the PCE1 of the adjacent L2SC layer can be implemented by the following way (but not limited thereto): the PCE1 of the PSC layer determining an adjacent layer, wherein the adjacent layer of the PCE1 of the PSC layer is an adjacent layer indicated by the interlayer information of this PCE1; acquiring the indication information of all the PCEs of the PCE1 adjacent layer; selecting, in all the PCEs of the adjacent layer, a PCE which is indicated by the indication information to be able to be used as a default interlayer path calculation element, as the PCE1 of the L2SC layer.

The PCE1 of the L2SC layer discovers that the topology area between the LSR1 and LSR4 of the present layer is disconnected, then selects the PCE1 of the adjacent TDM layer according to the layer information flooded by each PCE in the PCE topology and sends thereto a path calculation request from layer boundary node LSR2 to LSR3 of the L2SC layer;

The way of selecting the PCE1 of the adjacent TDM layer is the same as that of selecting the PCE1 of the adjacent L2SC layer.

The PCE1 of the TDM layer discovers that the topology area between the LSR1 and LSR4 of the present layer is disconnected, then selects the PCE1 of the adjacent LSC layer according to the layer information flooded by each PCE in the PCE topology and sends thereto a path calculation request from layer boundary node LSR2 to LSR3 of the TDM layer.

The way of selecting the PCE1 of the adjacent LSC layer is the same as that of selecting the PCE1 of the adjacent L2SC layer.

The PCE1 of the LSC layer replies the calculated path TDM layer boundary LSR2-LSC layer LSR1-LSC layer LSR2-LSC layer LSR4-TDM layer boundary LSR3 to the PCE1 of the upper layer TDM layer;

The PCE1 of the TDM layer replies the calculated path L2SC layer boundary LSR2-TDM layer LSR1-TDM layer boundary LSR2-LSC layer LSR1-LSC layer LSR2-LSC layer LSR4-TDM layer boundary LSR3-TDM layer LSR4-L2SC layer boundary LSR3 to the PCE1 of the upper layer L2SC layer.

The PCE1 of the L2SC layer replies the calculated path PSC layer boundary LSR2-L2SC layer LSR1-L2SC layer boundary LSR2-TDM layer LSR1-TDM layer boundary LSR2-LSC layer LSR1-LSC layer LSR2-LSC layer LSR4-TDM layer boundary LSR3-TDM layer LSR4-L2SC layer boundary LSR3-L2SC layer LSR4-PSC layer boundary LSR3 to the PCE1 of the upper layer PSC layer.

The PCE1 of the PSC layer replies to the LSR1 of the PSC layer the final path calculation result PSC layer LSR1-PSC layer boundary LSR2-L2SC layer LSR1-L2SC layer boundary LSR2-TDM layer LSR1-TDM layer boundary LSR2-LSC layer LSR1-LSC layer LSR2-LSC layer LSR4-TDM layer boundary LSR3-TDM layer LSR4-L2SC layer boundary LSR3-L2SC layer LSR4-PSC layer boundary LSR3-PSC layer LSR4.

The expressed scope of this calculation example further includes the situation that one PCE may possess visual capability for several layers (but not all the layers), and the implementation mechanism is similar to the above steps, which will not be enumerated here. The situation described in FIG. 5 is only one scenario, and the claims of the present patent are not limited to the layer structure combination described in FIG. 5.

Figure 6:
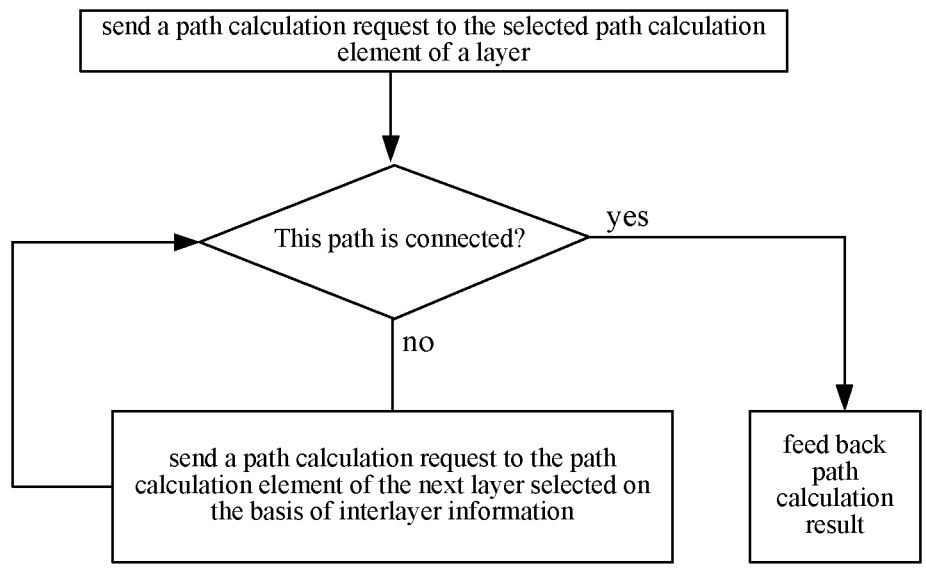
FIG. 6 is a flowchart of a method according to the present invention.

However, FIG. 6 shows the general concept of the present invention. In this case, a label switch router (LSR) of the first layer selects a path calculation element (PCE) of the first layer according to the discovery information of each PCE and sends thereto a path calculation request for the label switch router (LSR); when the path calculation element (PCE) of the first layer determines that a path for the label switch router (LSR) is disconnected, it selects based on the interlayer information, a path calculation element (PCE) of the second layer which is adjacent to the first layer, and sends thereto a path calculation request for the disconnected portion of the path; when the path calculation element (PCE) of the second layer determines that a replacement path of the second layer which is used for replacing the disconnected portion in the first layer so as to enable it connected is connected, it replies the replacement path to the PCE of the first layer; and the PCE of the first layer replies the final path calculation result to the LSR of the first layer.

In summary, the technical solution proposed in the present invention achieves the interlayer path discovery and calculation of the PCE by the PCC by way of adding the information content of a layer in the PCE discovery information in the GMPLS network. It overcomes the re-calculation application of PCC caused by that the received cross-layer path does not meet the requirements of the PCC in the prior art, thereby improving the execution efficiency of the PCC applying for calculating an interlayer path.

Above description is only to illustrate the preferred embodiments but not to limit the present invention. Various alternations and changes to the present invention are apparent to those skilled in the art. The scope defined in the claims shall comprise any modification, equivalent substitution and improvement within the spirit and principle of the present invention.

What is claimed is:

1. A method for calculating an interlayer path, comprising:
  a label switch router (LSR) of a present layer selecting a path calculation element (PCE) of the present layer according to received discovery information of each PCE and sending thereto a path calculation request for the LSR, wherein the discovery information comprises: indication information and interlayer information, with the indication information indicating whether the PCE can be used as a default interlayer path calculation element of the present layer, and the interlayer information indicating a layer where the PCE is located and one or more adjacent layers thereof;
  when a path of the LSR is disconnected, selecting, based on the interlayer information, a path calculation element (PCE) of the next layer and sending thereto a path calculation request for the disconnected portion of the path until the path is connected; and
  replying a path calculation result to the PCE of the present layer.

2. The method according to claim 1, wherein the present layer is a first layer and the next layer is a second layer, and
  a label switch router (LSR) of the first layer selecting a path calculation element (PCE) of the first layer according to the discovery information of the each PCE and sending thereto a path calculation request for the label switch router (LSR);
  when the path calculation element (PCE) of the first layer determines that a path for the label switch router (LSR) is disconnected, selecting, based on the interlayer information, a path calculation element (PCE) of the second layer which is adjacent to the first layer, and sending thereto a path calculation request for the disconnected portion of the path;
  when the PCE of the second layer determines that a second layer replacement path is connected, replying the second layer replacement path to the PCE of the first layer, wherein the second layer replacement path is a path in the second layer for replacing the disconnected portion in the first layer; and
  the PCE of the first layer replying the final path calculation result to the LSR of the first layer.

3. The method according to claim 2, wherein when the PCE of the first layer determines that the path for the label switch router (LSR) is connected, the PCE of the first layer replies the calculated path to the LSR of the first layer.

4. The method according to claim 2, wherein when the PCE of the second layer determines that the second layer replacement path is disconnected, the PCE of the second layer selects a PCE of a third layer which is adjacent to the second layer according to the interlayer information and sends thereto a path calculation request for the disconnected portion of the replacement path.

5. The method according to claim 4, wherein when the PCE of the third layer determines that the third layer replacement path is disconnected, the PCE of the third layer selects a PCE of a fourth layer which is adjacent to the third layer according to the interlayer information and sends thereto a path calculation request for the disconnected portion of the replacement path, wherein the third layer replacement path is a path for replacing the disconnected portion in the first layer.

6. The method according to claim 5, wherein when the PCE of the fourth layer determines that the fourth layer replacement path is connected, the PCE of the fourth layer replies the calculated path to the PCE of the third layer, wherein the fourth layer replacement path is a path for replacing the disconnected portion in the first layer.

7. The method according to claim 6, wherein the PCE of the third layer replies the calculated path to the PCE of the second layer.

8. The method according to claim 5, wherein the first layer, second layer, third layer, and fourth layer are PSC layer, L2SC layer, TDM layer, and LSC layer respectively.

9. The method according to claim 2, wherein before the LSR of the first layer selects the PCE of the first layer according to the layer discovery information, further comprising:
the PCEs of a plurality of layers forming one PCE network topology in which the discovery information of each PCE is flooded according to a predetermined route protocol embodiment.

10. The method according to claim 1, wherein
the indication information is the Yd bit of the PATH-SCOPE sub-TLV, and the interlayer information is the sub TLV of the PCE layer and the sub TLV of the adjacent PCE layer,
wherein when the Yd bit has a first value, the PCED TLV does not include the sub TLV of the adjacent PCE layer; when the Y bit has a second value, the Yd bit also has a second value; and if the Y bit is set as a first value and the Yd bit is set as a second value, then the sub-TLV of the adjacent PCE layer needs to appear at least once.

11. The method according to claim 1, wherein the LSR of the layer selecting a path calculation element (PCE) of the layer according to the received discovery information of each PCE comprises:
the LSR of the layer parsing the discovery information of each PCE and determining all the PCEs of the layer; and
acquiring the indication information of all the PCEs of the layer, and selecting as a path calculation element (PCE) of the layer a PCE which is indicated by the indication information to be able to be used as a default interlayer path calculation element of the layer.

12. The method according to claim 1, wherein selecting based on the interlayer information a path calculation element (PCE) of the next layer comprises:
the path calculation element (PCE) of the layer determining an adjacent layer, wherein the adjacent layer is an adjacent layer indicated by the interlayer information of the PCE;
acquiring the indication information of all the PCEs of the adjacent layer; and
in all the PCEs of the adjacent layer, selecting a PCE which is indicated by the indication information to be able to be used as a default interlayer path calculation element as a path calculation element (PCE) of the next layer.

13. The method according to claim 6, wherein the first layer, second layer, third layer, and fourth layer are PSC layer, L2SC layer, TDM layer, and LSC layer respectively.

14. The method according to claim 7, wherein the first layer, second layer, third layer, and fourth layer are PSC layer, L2SC layer, TDM layer, and LSC layer respectively.

15. The method according to claim 2, wherein the LSR of the layer selecting a path calculation element (PCE) of the layer according to the received discovery information of each PCE comprises:
the LSR of the layer parsing the discovery information of each PCE and determining all the PCEs of the layer; and
acquiring the indication information of all the PCEs of the layer, and selecting as a path calculation element (PCE) of the layer a PCE which is indicated by the indication information to be able to be used as a default interlayer path calculation element of the layer.

16. The method according to claim 9, wherein the LSR of the layer selecting a path calculation element (PCE) of the layer according to the received discovery information of each PCE comprises:
the LSR of the layer parsing the discovery information of each PCE and determining all the PCEs of the layer; and
acquiring the indication information of all the PCEs of the layer, and selecting as a path calculation element (PCE) of the layer a PCE which is indicated by the indication information to be able to be used as a default interlayer path calculation element of the layer.

17. The method according to claim 10, wherein the LSR of the layer selecting a path calculation element (PCE) of the layer according to the received discovery information of each PCE comprises:
the LSR of the layer parsing the discovery information of each PCE and determining all the PCEs of the layer; and
acquiring the indication information of all the PCEs of the layer, and selecting as a path calculation element (PCE) of the layer a PCE which is indicated by the indication information to be able to be used as a default interlayer path calculation element of the layer.

18. The method according to claim 2, wherein selecting based on the interlayer information a path calculation element (PCE) of the next layer comprises:
the path calculation element (PCE) of the layer determining an adjacent layer, wherein the adjacent layer is an adjacent layer indicated by the interlayer information of the PCE;
acquiring the indication information of all the PCEs of the adjacent layer; and
in all the PCEs of the adjacent layer, selecting a PCE which is indicated by the indication information to be able to be used as a default interlayer path calculation element as a path calculation element (PCE) of the next layer.

19. The method according to claim 9, wherein selecting based on the interlayer information a path calculation element (PCE) of the next layer comprises:
the path calculation element (PCE) of the layer determining an adjacent layer, wherein the adjacent layer is an adjacent layer indicated by the interlayer information of the PCE;
acquiring the indication information of all the PCEs of the adjacent layer; and in all the PCEs of the adjacent layer, selecting a PCE which is indicated by the indication information to be able to be used as a default interlayer path calculation element as a path calculation element (PCE) of the next layer.

20. The method according to claim 10, wherein selecting based on the interlayer information a path calculation element (PCE) of the next layer comprises:
   the path calculation element (PCE) of the layer determining an adjacent layer, wherein the adjacent layer is an adjacent layer indicated by the interlayer information of the PCE;
   acquiring the indication information of all the PCEs of the adjacent layer; and
   in all the PCEs of the adjacent layer, selecting a PCE which is indicated by the indication information to be able to be used as a default interlayer path calculation element as a path calculation element (PCE) of the next layer.

* * * * *